(No Model.)
H. J. MOUZON.
FEED AND WATER TRAY FOR CHICKENS.
No. 366,499. Patented July 12, 1887.
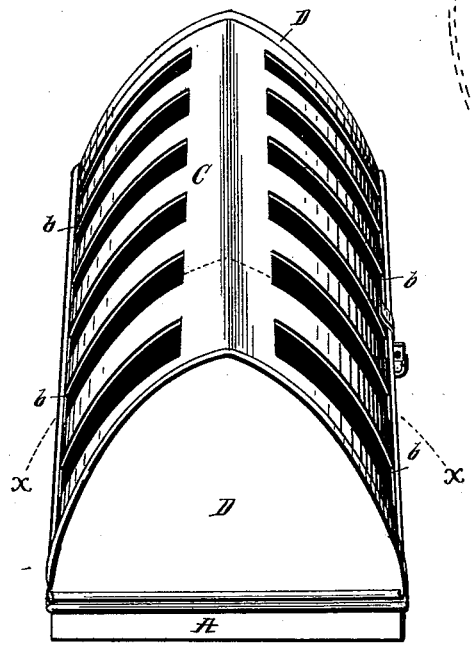
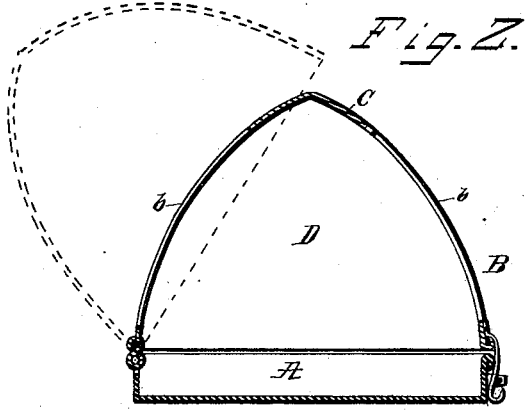
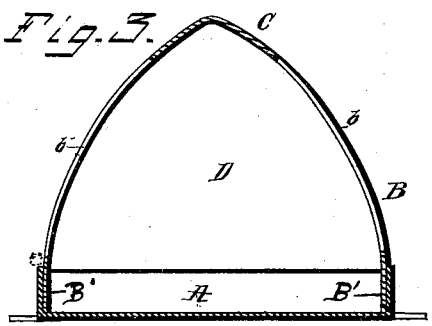
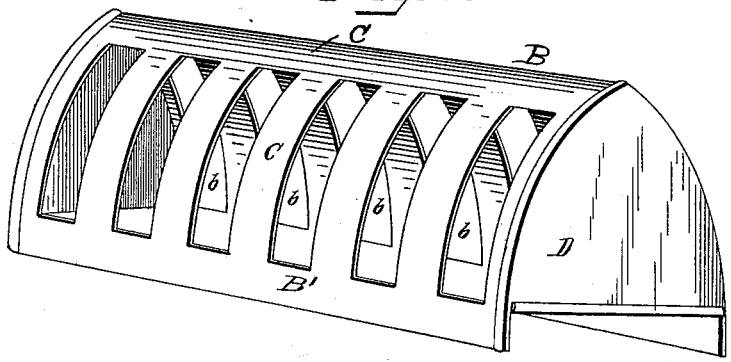
Witnesses.
M. A. Barnes.
Sarepta Specht.
Inventor.
Henry J. Mouzon
By R. S. & A. P. Lacey
Attys.

UNITED STATES PATENT OFFICE.

HENRY J. MOUZON, OF BAMBERG, SOUTH CAROLINA.

FEED AND WATER TRAY FOR CHICKENS.

SPECIFICATION forming part of Letters Patent No. 366,499, dated July 12, 1887.

Application filed April 23, 1887. Serial No. 235,881. (No model.)

*To all whom it may concern:*

Be it known that I, HENRY J. MOUZON, a citizen of the United States, residing at Bamberg, in the county of Barnwell and State of South Carolina, have invented certain new and useful Improvements in Feed and Water Trays for Chickens; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to trays for holding feed and water for chickens, and has for its object the production of a device which will prevent the crowding and tramping of the poultry, and which will guard against any contamination of the food and water from the filth usually carried thereto by the feet of the poultry, and prevent young chickens from wetting or drowning themselves in their drinking-water, inasmuch as the body of the poultry is excluded from and the head only allowed to enter the tray. It also obviates the necessity of throwing away food and water unconsumed and cleansing the tray after each meal.

The improvement consists in a tray and movable cap, which is provided with a series of openings of desired size to admit the head and neck of poultry to be fed. The spaces between the openings are just sufficient to admit of the poultry feeding to stand side by side, so that others are prevented from crowding in between them.

The improvement further consists in the novel features, which I will now proceed to describe, referring by letters to the annexed drawings, forming part of this specification, in which—

Figure 1 is an isometric perspective view; Fig. 2, a cross section on the line X X of Fig. 1; Fig. 3, a cross-section of a modified form, and Fig. 4 is a perspective of the cap shown in Fig. 3.

The device is composed of the tray A, of suitable size and depth, and the cap B, which consists of the middle portion, C, and the ends D. The middle portion, C, is made of a single piece of sheet material bent so as to form sides having openings $b$, through which the poultry have access to the tray. The openings are oblong and extend vertically in the direction of their length, which permit the free up-and-down movement of the heads of the poultry while feeding.

The cap may rest upon the edges of the tray and be hinged thereto at one side, and secured thereto at the opposite side by suitable means, as the hasp and staple, or the sides of the middle portion, may project down and rest upon the bottom of the tray, which construction obviates the necessity of hinges or fastening devices, as the cap will be held from lateral displacement.

In practice the trays will be made of graduated sizes, and the openings in the caps of each will vary in width according to the kind of poultry to be fed. To use one of such trays, the cap is either removed or thrown back and food or water is placed in the tray proper, and the cap is replaced. If the tray is designed for young chickens, the openings will be proportionately small; hence the larger or full-grown chickens cannot gain access to the tray and eat the food.

The tray will be provided with cleats, as shown in Fig. 3, for securing it to a block, so it cannot be overturned and the food or drink wasted.

The pintles of the hinges by which the cap is held to the tray may be drawn out and the cap removed and set on the ground. Sometimes it may be desired to place the feed on the ground instead of in the tray. The cap, as shown in Figs. 3 and 4, is specially adapted for this latter use. The extensions B′ hold the cap in the tray, and serve also as legs or supports when the cap is placed on the ground.

The cap, as shown in Figs. 3 and 4, could be hinged, as indicated in dotted lines, Fig. 3; but it is not necessary to do so, as the extensions B′ hold it firmly enough in the tray.

Having thus described my invention, what I claim, and desire to secure by Letters Patent, is—

1. The herein shown and described cap, composed of a single piece of sheet material bent to form sides which are provided with a series of vertical openings, and having ends connecting the sides and closing them in, substantially as and for the purpose specified.

2. The herein shown and described poultry-feeding device, composed of the shallow tray A, and the cap consisting of the middle portion made of a single piece of sheet material bent to form sides which have vertical openings and extensions resting upon the bottom of the tray, and the ends which close in the sides and rest on the ends of the tray, substantially as specified.

In testimony whereof I affix my signature in presence of two witnesses.

HENRY J. MOUZON.

Witnesses:
J. A. MURDAUGH,
W. G. KEARN.